(12) United States Patent
Lee et al.

(10) Patent No.: US 6,854,984 B1
(45) Date of Patent: Feb. 15, 2005

(54) SLIM USB CONNECTOR WITH SPRING-ENGAGING DEPRESSIONS, STABILIZING DIVIDERS AND WIDER END RAILS FOR FLASH-MEMORY DRIVE

(75) Inventors: Edward W. Lee, Mountain View, CA (US); Ren-Kang Chiou, Fremont, CA (US); Tzu-Yih Chu, San Jose, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 93 days.

(21) Appl. No.: 10/605,146

(22) Filed: Sep. 11, 2003

(51) Int. Cl.[7] ............................................. H01R 12/00
(52) U.S. Cl. ....................................... 439/79; 439/610
(58) Field of Search ........................ 439/79, 379, 607, 439/610, 680, 660, 639, 291, 292, 295, 677, 374; 235/431, 451, 441

(56) References Cited

U.S. PATENT DOCUMENTS

| 5,725,395 | A | 3/1998 | Lee et al. ................... 439/610 |
| 5,941,733 | A | 8/1999 | Lai et al. ................... 439/610 |
| 6,027,375 | A | 2/2000 | Wu et al. ................... 439/607 |
| 6,165,016 | A | 12/2000 | Lai ........................... 439/610 |
| 6,334,793 | B1 * | 1/2002 | Amoni et al. ............... 439/680 |
| 6,385,677 | B1 | 5/2002 | Yao ........................... 711/115 |
| 6,439,464 | B1 | 8/2002 | Fruhauf et al. ............. 235/492 |
| 6,533,612 | B1 | 3/2003 | Lee et al. ................... 439/607 |
| 6,561,421 | B1 | 5/2003 | Yu ............................. 235/451 |
| 6,567,273 | B1 | 5/2003 | Liu et al. ................... 361/737 |
| 2003/0100203 | A1 | 5/2003 | Yen ............................. 439/79 |
| 2003/0104835 | A1 | 6/2003 | Douhet ....................... 455/557 |

OTHER PUBLICATIONS

PQI, "Intelligent Stick" F1ADP/1699 Web page 9/03, 2 pp.

* cited by examiner

*Primary Examiner*—Alex Gilman
(74) *Attorney, Agent, or Firm*—Stuart T. Auvinen

(57) ABSTRACT

A slim Universal-Serial-Bus (USB) connector fits on only one side of the connector substrate in a standard female USB connector. Wobble or vertical play is reduced by locking depressions in the slim USB connector that engage metal springs on a metal case that surrounds the female USB connector, locking the two connectors together. Between metal contacts on the slim USM connector are dividers that help fill in gaps when the two connectors are connected together, further reducing play. End rails on the slim USB connector fill in gaps on the sides. The connector substrate of the slim USB connector can be separate or can be integrated with a circuit board that holds a flash memory chip and a USB controller chip. The connector is wider than the standard width for a better fit. A slim female USB connector for use with the slim male USB connector is also disclosed.

20 Claims, 12 Drawing Sheets

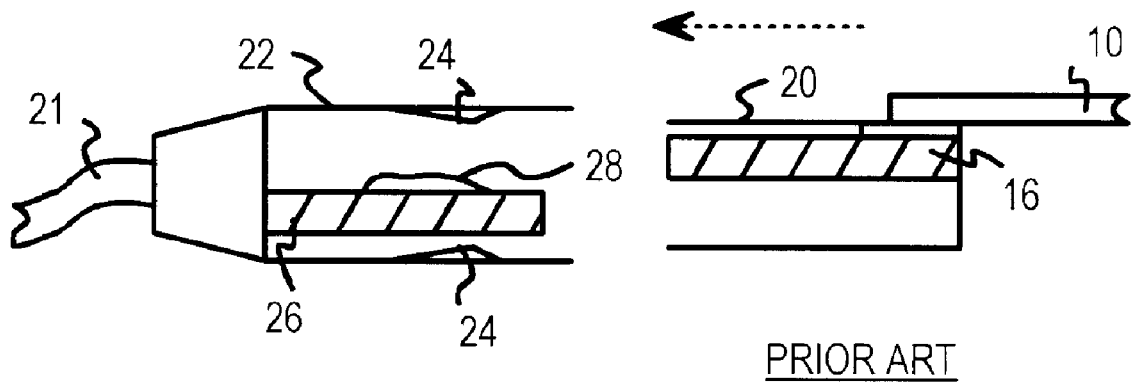
FIG. 2A  PRIOR ART
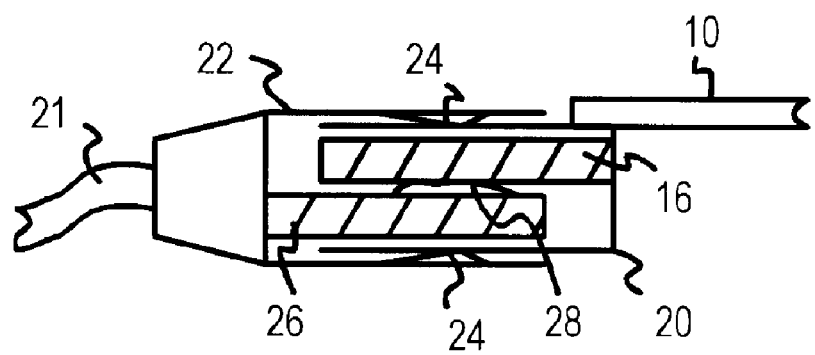
PRIOR ART  FIG. 2B

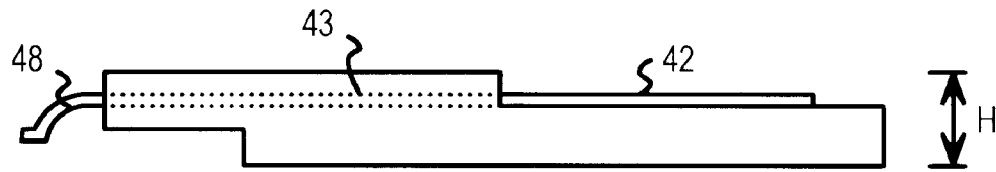
SIDE CROSS-SECTIONAL VIEW  FIG. 5C
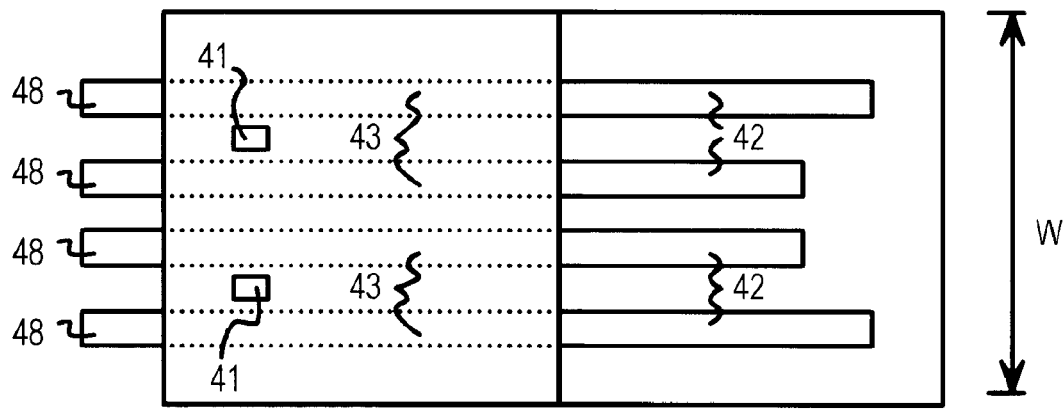
TOP VIEW  FIG. 5D
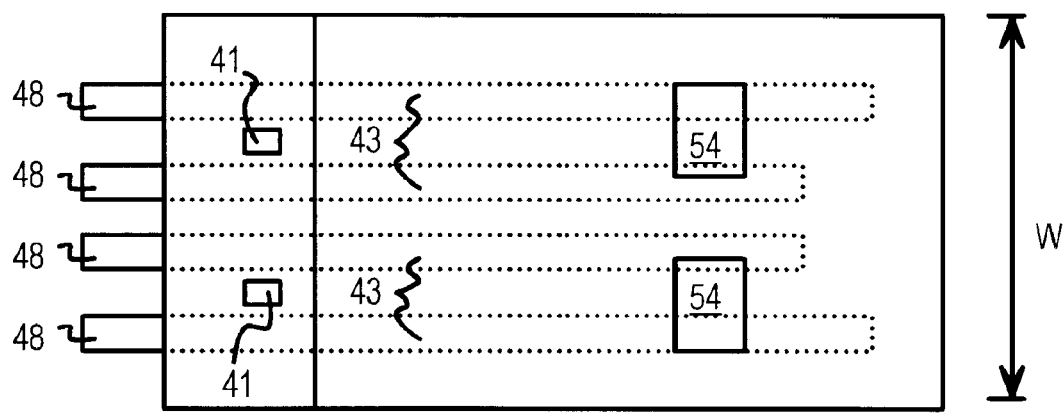
BOTTOM VIEW  FIG. 5E

TOP VIEW

TOP VIEW

US 6,854,984 B1

SLIM USB CONNECTOR WITH SPRING-ENGAGING DEPRESSIONS, STABILIZING DIVIDERS AND WIDER END RAILS FOR FLASH-MEMORY DRIVE

BACKGROUND OF INVENTION

This invention relates to electronic connectors, and more particularly to reduced-height Universal-Serial-Bus (USB) connectors.

Rapid advances in technology in several areas have converged to enable small, portable memory cards with vast capacities. Flash memory technologies such as those using electrically-erasable programmable read-only memory (EEPROM) have produced chips storing 128 M-Bytes or more. Small flash-memory cards have been designed that have a connector that can plug into a specialized reader, such as for compact-flash, secure-digital, memory stick, or other standardized formats.

More recently, flash memory cards are being sold that contain a USB connector. Such USB-flash memory cards do not require a specialized reader but can be plugged into a USB connector on a personal computer (PC). These USB-flash memory cards can be used in place of floppy disks. A USB-flash card can have a capacity of more than ten floppy disks in an area not much larger than a large postage stamp.

FIG. 1A shows a prior-art flash-memory card with a USB connector. Flash memory chip 12 may be a 128 Mega-byte non-volatile chip or may have some other capacity. Controller chip 14 contains a flash-memory controller that generates signals to access memory locations within flash memory chip 12. Controller chip 14 also contains a USB interface controller that serially transfers data to and from flash memory chip 12 over a USB connection.

USB connector 20 may be mounted on board 10, which is a small circuit board with chips 12, 14 mounted thereon. Multi-layer printed-circuit board (PCB) technology can be used for board 10. A plastic case (not shown) can surround board 10.

USB connector 20 contains a small connector substrate 16, which is often white ceramic, black rigid plastic, or another sturdy substrate. Connector substrate 16 has four or more metal contacts 18 formed thereon. Metal contacts 18 carry the USB signals generated or received by controller chip 14. USB signals include power, ground, and serial differential data D+, D−.

USB connector 20 contains a metal case that wraps around connector substrate 16. The metal case touches connector substrate 16 on three of the sides of connector substrate 16. The top side of connector substrate 16, holding metal contacts 18, has a large gap to the top of the metal case. On the top and bottom of this metal wrap are formed holes 15. USB connector 20 is a male connector, such as a type-A USB connector.

FIG. 1B shows a female USB connector. Female USB connector 22 can be an integral part of a PC, or can be connected by cable 21. Another connector substrate 26 contains four metal contacts 28 that make electrical contact with the four metal contacts 18 of the male USB connector 20 of FIG. 1A. Connector substrate 26 is wrapped by a metal case, but small gaps are between the metal case and connector substrate 26 on the lower three sides.

Locking is provided by metal springs 24 in the top and bottom of the metal case. When male USB connector 20 of FIG. 1A is flipped over and inserted into Female USB connector 22 of FIG. 1B, metal springs 24 lock into holes 15 of male USB connector 20.

FIGS. 2A, 2B are cross-sections highlighting connections between male and female USB connectors. Female USB connector 22 is on the left while male USB connector 20 is being inserted from the right. Male USB connector 20 is flipped over relative to the view of FIG. 1A. Metal contacts 18 are formed on the lower surface of connector substrate 16 on male USB connector 20, while metal contacts 28 are formed on the upper surface of connector substrate 26 on Female USB connector 22. Thus the metal contacts face one another to allow for electrical contact when male USB connector 20 is inserted into Female USB connector 22 as shown in FIG. 2B.

Metal springs 24 formed on the metal case surrounding connector substrate 26 on Female USB connector 22 fit into holes on the metal case of male USB connector 20. This helps to lock the connectors together.

FIG. 3 shows a prior-art USB flash memory card using a slim USB connector. Male USB connector 20 of FIGS. 1, 2 is relatively large. The metal case in particular is cumbersome and increases manufacturing cost. Costs may be reduced by integrating male USB connector 30 with board 32. Board 32 is a PCB that has flash memory chip 12 and controller chip 14 mounted thereon. Board 32 is extended to include male USB connector 30, which has metal contacts 38 formed on end 36 of board 32.

The width and thickness of board 32 at end 36 containing male USB connector 30 is designed to approximately match that of connector substrate 16 of FIG. 1A. Plastic case 34 can enclose board 32 but have an opening for metal contacts 38. Plastic case 34 can cover the bottom and sides of male USB connector 30 up to end 36 to emulate potions of the metal case of the male USB connector of FIG. 1A.

FIGS. 4A, 4B show cross-sections of the prior-art slim USB connector being inserted into a standard Female USB connector. Board 32 that has male USB connector 30 formed on end 36 is flipped over from the view shown in FIG. 3, and end 36 is inserted into female USB connector 22 from the right side.

Metal contacts 38 are located on the lower surface of male USB connector 30. Plastic case 34 has an opening on the lower surface of male USB connector 30 to expose the metal contacts so they can make electrical connection with metal contacts 28 on the upper surface of connector substrate 26 of Female USB connector 22 when inserted as shown in FIG. 4B.

Plastic case 34 helps to fill the gate between board 32 and the top edge of the metal case of Female USB connector 22. However, no holes are provided in plastic case 34, so metal springs 24 are pushed up slightly when male USB connector 30 is inserted into Female USB connector 22. Plastic case 34 is also formed along the thin edges of board 32 and helps to fill in the gaps between connector substrate 26 and the sides of the metal case of Female USB connector 22 that are above and below the plane of FIG. 4B.

While slim USB connector 30 can be less expensive and smaller than the standard USB connector, it fits less securely into a standard Female USB connector. The lack of the metal case removes the mechanical support provided as the male metal case that fit in the gap below connector substrate 26 and the bottom side of the metal case for the female connector. Also, plastic case 34 does not lock into metal springs 24 on the top of Female USB connector 22. The result is a noticeable wobble in the up and down direction when a USB flash memory card containing male USB connector 30 is inserted into Female USB connector 22. Vertical movement of 3–4 millimeter at the end of a 4-centimeter flash card can occur with slight finger pressure. This vertical play gives the user the feeling that the flash memory card is cheap and unreliable, even when sufficient electrical contact is made.

What is desired is a slim USB connector with reduced vertical wobble. A slim USB connector that more securely fits into a standard Female USB connector is desired. A slim USB connector with a more secure fit is desire d that can be integrated with the circuit board containing the flash memory chip is also desirable.

BRIEF DESCRIPTION OF DRAWINGS

FIGS. 2A, 2B are cross-sections highlighting connections between male and female USB connectors.

FIGS. 5A–E show a slim USB connector with locking depressions, dividers, and end rails.

DETAILED DESCRIPTION

The present invention relates to an improvement in slim USB connectors. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

FIGS. 5A–E show a slim USB connector with locking depressions, dividers, and end rails. Male slim USB connector 40 does not include a metal case surrounding a connector substrate, allowing the height H (FIG. 5C) and cost of the connector to be reduced. Instead, the width W (FIG. 5D, E) is wider than the standard male USB connector. The width W is increased by twice the width of the metal case that wraps the standard male USB connector. Thus the increased width accounts for the missing metal case of the slim USB connector.

Figure 1A:
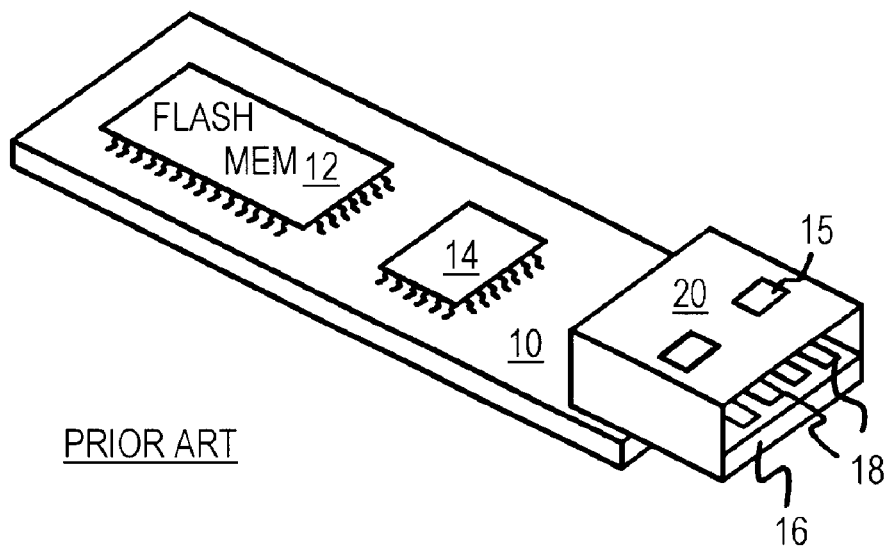
FIG. 1A shows a prior-art flash-memory card with a USB connector.
Figure 1B:
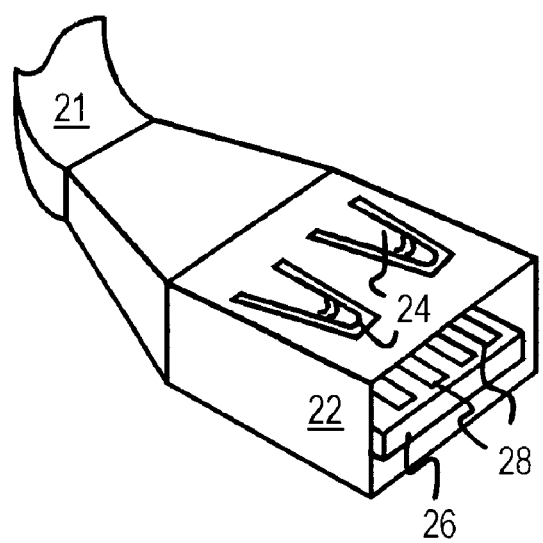
FIG. 1B shows a female USB connector.
Figure 3:
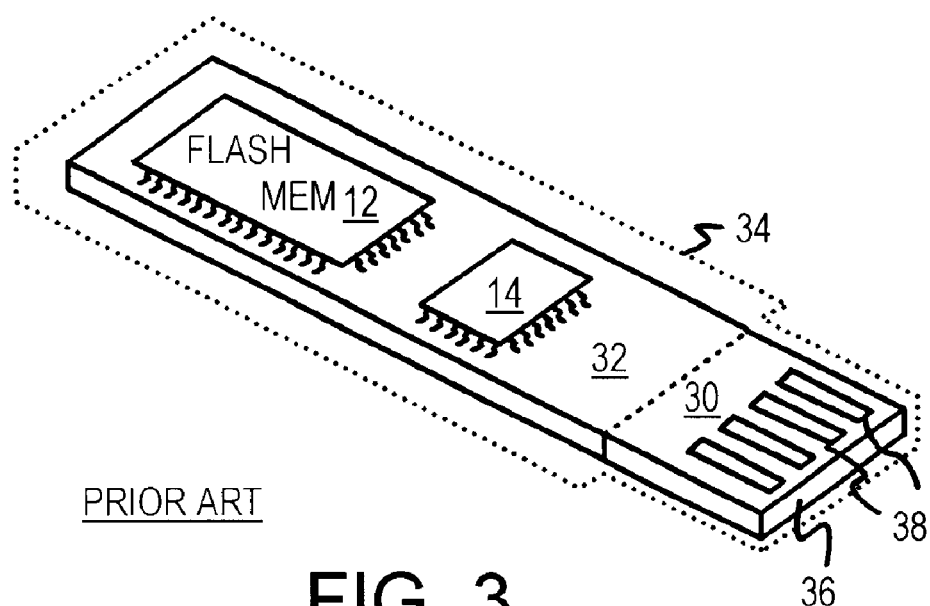
FIG. 3 shows a prior-art USB flash memory card using a slim USB connector.
Figure 4A:
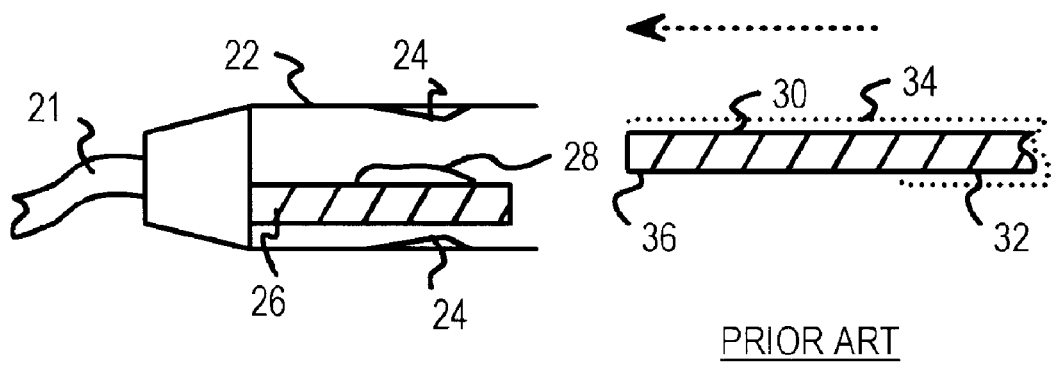
FIGS. 4A, 4B show cross-sections of the prior-art slim USB connector being inserted into a standard Female USB connector.
Figure 4B:
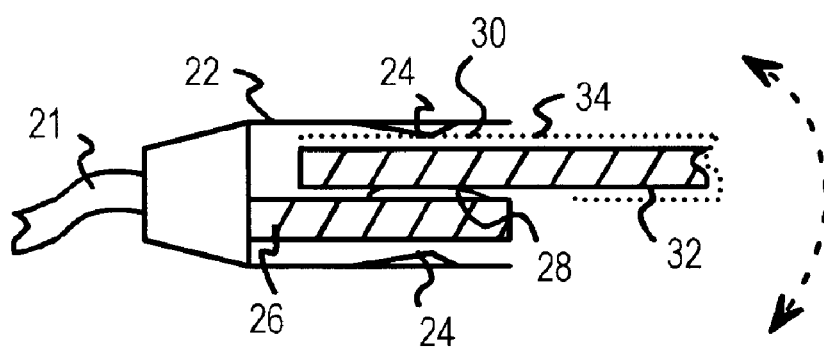
Figure 5A:
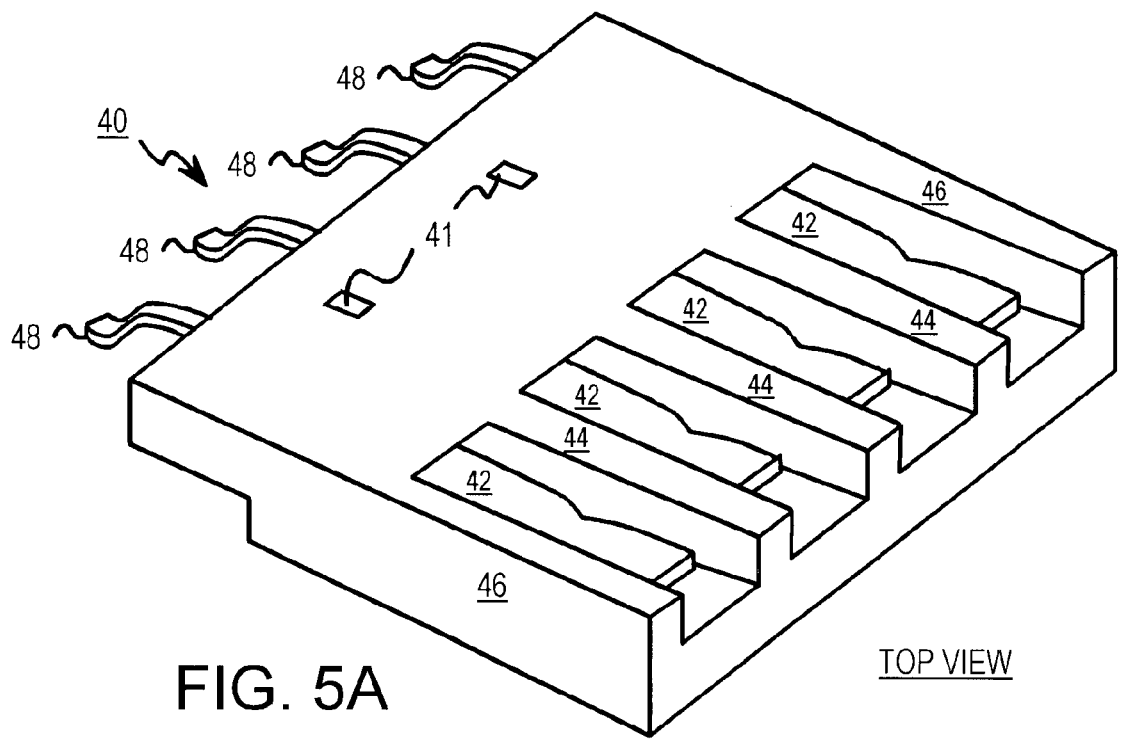

Visible in the top view of FIG. 5A, metal contacts 42 are placed on a top surface of male slim USB connector 40 between dividers 44 and end rails 46. Metal contacts 42 can be flat, or can have a bend in them to produce a spring action to provide better contact with the metal contacts on a female USB connector. Dividers 44 and end rails 46 can have a low height to allow metal contacts 42 to reach the metal contacts on the female USB connector.

Tabs 48 are electrically connected to metal contacts 42 through metal lines or extensions 43 within male slim USB connector 40. Tabs 48 can be surface mounted or soldered to a circuit board such as one that contains flash memory and controller chips. Corners and shapes can be changed on some embodiments to allow for easier automated handling but may be deleted or of a different shape or size in other embodiments. Other features such as posts, notches, etc. may be present for a variety of purposes or reasons. For example, two small holes 41 may be provided at the rear of male slim USB connector 40 near tabs 48 to receive a metal clip for securing male slim USB connector 40 to a board, such as a PCB.

Figure 5B:
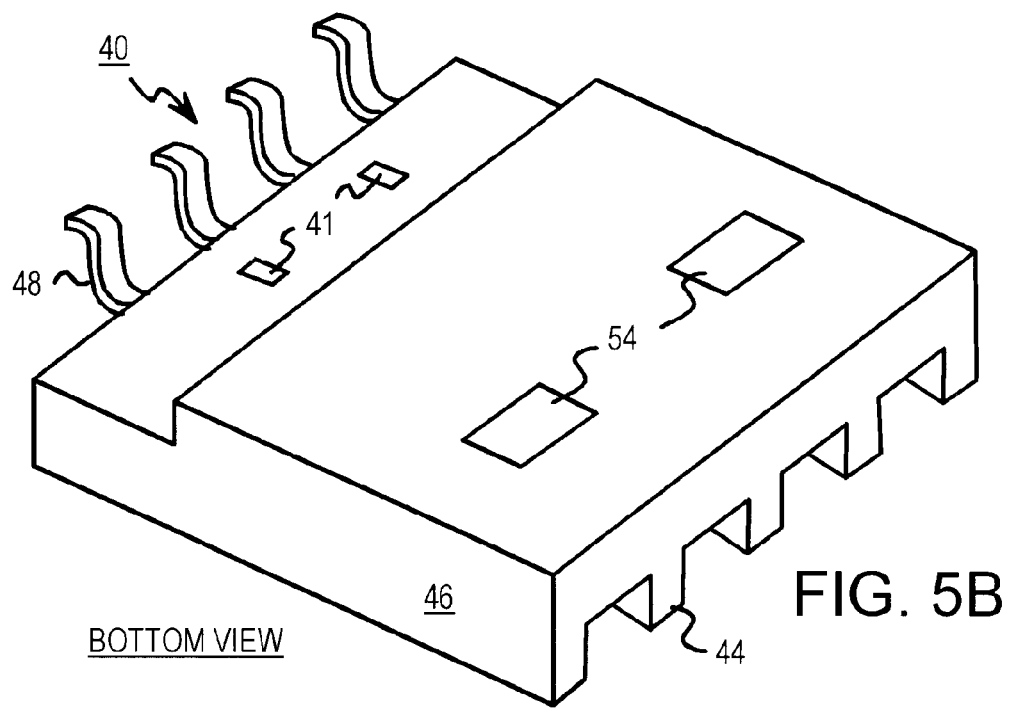

Visible in the bottom view of FIG. 5B, locking depressions 54 are formed on the lower side of male slim USB connector 40. Locking depressions 54 are aligned with the metal springs on the female USB connector. When male slim USB connector 40 is inserted into a standard Female USB connector, metal springs are guided into locking depressions 54 locking the two connectors together, improving alignment and mechanical engagement and stability.

Depressions 54 perform the function of the holes in the metal case of the prior-art male USB connector. Depressions 54 allow the metal springs on the female USB connector to lock into a location in locking depressions 54, securing the male and female USB connectors together.

End rails 46 further help align male slim USB connector 40 when inserted into a female USB connector, while dividers 44 help fill the gap between connectors. Thus a more secure connection can be made using male slim USB connector 40 since gaps are filled in more precisely and locking depressions 54 can lock with metal springs on a female USB connector. End rails 46 may be taller than dividers 44 or may be the same height as the dividers.

FIG. 5C is a side cross-sectional view of male slim USB connector 40. Metal extensions 43 electrically connect metal contacts 42 to tabs 48. The height H of male slim USB connector 40 is less than the height of a standard male USB connector.

FIG. 5D is a top view of male slim USB connector 40. Metal extensions 43 electrically connect metal contacts 42 to tabs 48. The width W of male slim USB connector 40 is greater than the width of a standard male USB connector. The width is increased by twice the thickness of the metal case wrap of a standard male USB connector in one embodiment, but different widths may be used.

FIG. 5E is a bottom view of male slim USB connector 40. Locking depressions 54 are visible from the bottom. Depressions 54 are on the bottom surface opposite metal contacts 42.

FIGS. 6A–D show a male slim USB connector that is integrated with a circuit-board substrate of a flash memory card. The USB flash-memory card is assembled from upper case 62 of FIG. 6A, board 60 and its components of FIG. 6B, and lower case 64 of FIG. 6C, which are sandwiched together to form the card of FIG. 6D.

Figure 6A:
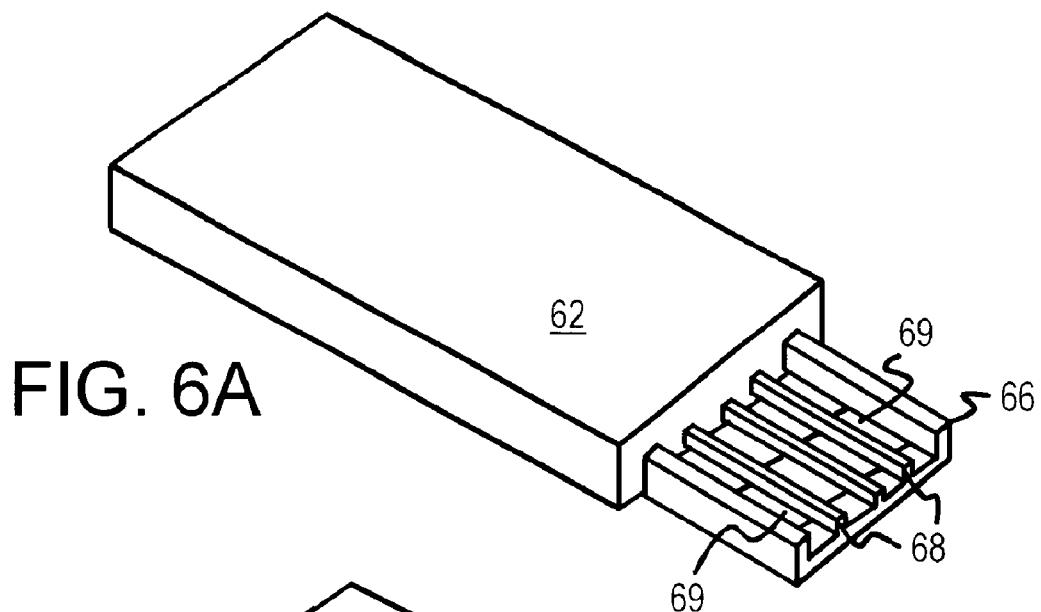
FIGS. 6A–D show a male slim USB connector that is integrated with a circuit-board substrate of a flash memory card.
Figure 6B:
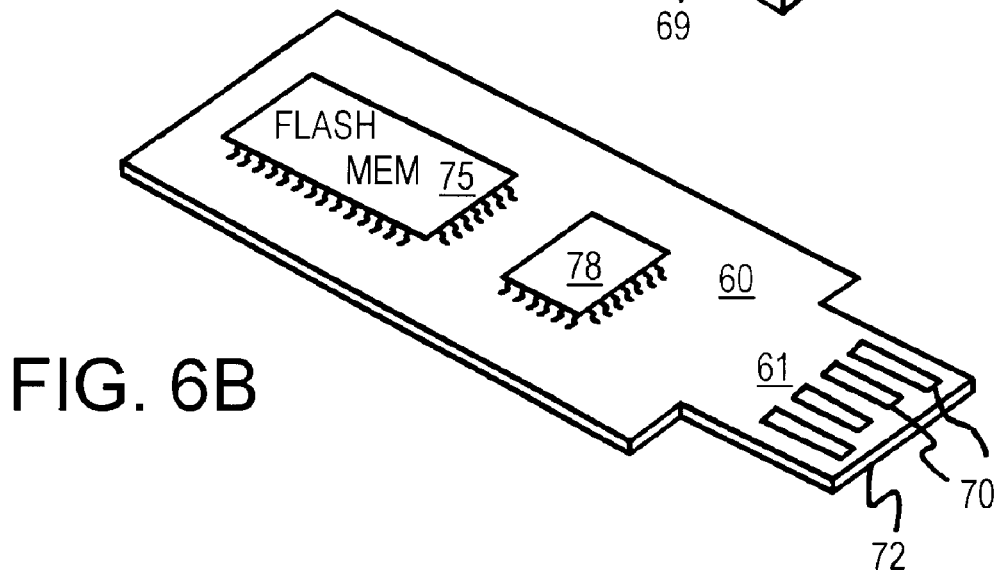

In FIG. 6B, flash memory chip 75 and controller chip 78 are mounted on board 60, which can be a multi-layer PCB or similar substrate with wiring traces. Extension 61 of board 60 has a width that approximately matches the width of the connector substrate in a male USB connector. Metal contacts 70 are formed on extension 61 to act as the USB metal contacts of the male slim USB connector. End 72 of board 60 is inserted into the female USB connector.

In FIG. 6A, upper case 62 can be made of plastic or other material. Two end rails 66 and three dividers 68 are formed on the extension end of upper case 62. Openings 69 in upper case 62 between dividers 68 and end rails 66 allow metal contacts 70 of FIG. 6B to be exposed through upper case 62 when assembled. Dividers 68 and end rails 66 can be made from the same material as the rest of upper case 62, such as by all being part of one plastic molding. End rails 66 may be taller than dividers 68 or may be the same height as the dividers.

Figure 6C:
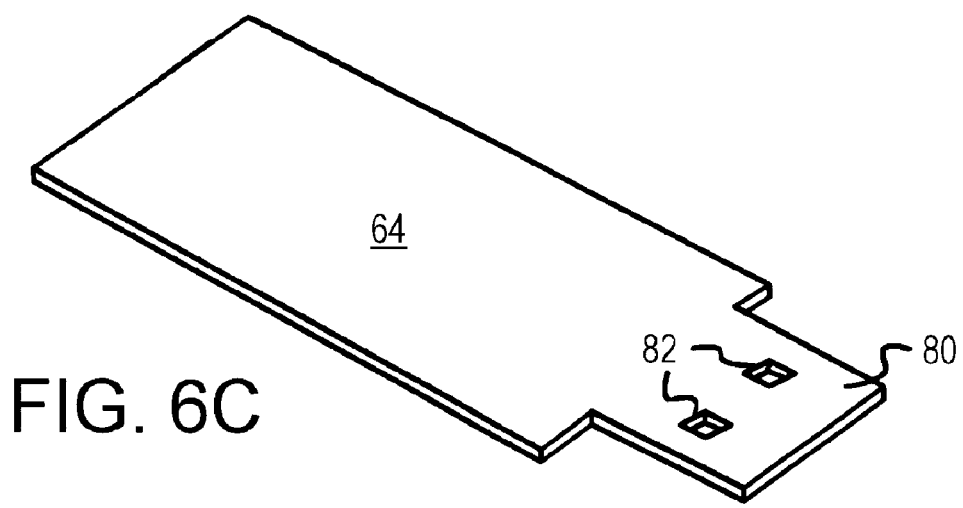

In FIG. 6C, lower case 64 includes extended region 80. Locking depressions 82 are in extended region 80. A single molding can form lower case 64 with locking depressions 82 in extended region 80.

Locking depressions 82 can be made in a variety of ways. For example, locking depressions 82 can be made during molding of lower case 64, or by milling, punching, or machining case 64 after molding. Depressions 82 can be holes that completely pass through case 64, or can be thinned regions that do not reach completely through case 64.

Figure 6D:
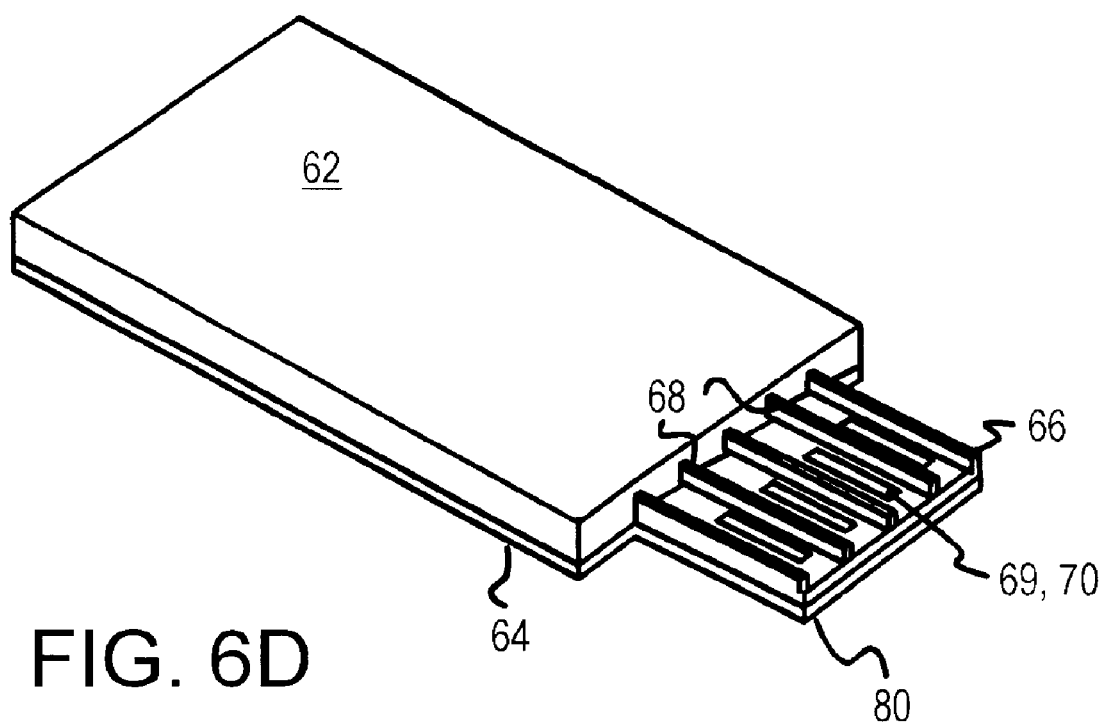

FIG. 6D shows an assembled USB flash-memory card. Upper case 62 and lower case 64 are plastic cases that fit together, enclosing board 60 of FIG. 6B. End rails 66 and dividers 68 in upper case 62 fit over extension 61 of board 60. Metal contacts 70 on board 60 are exposed through openings 69 in upper case 62 between dividers 68 and end rails 66. Locking depressions (not visible) are formed in lower case 64.

FIGS. 7A–E show an alternative integrated male slim USB connector integrated with optional metal dividers. The USB flash-memory card is assembled from upper case 62' of FIG. 7A, board 60 and its components of FIG. 7B, and lower case 64' of FIG. 7C, which are sandwiched together to form the card of FIG. 7D.

Figure 7A:
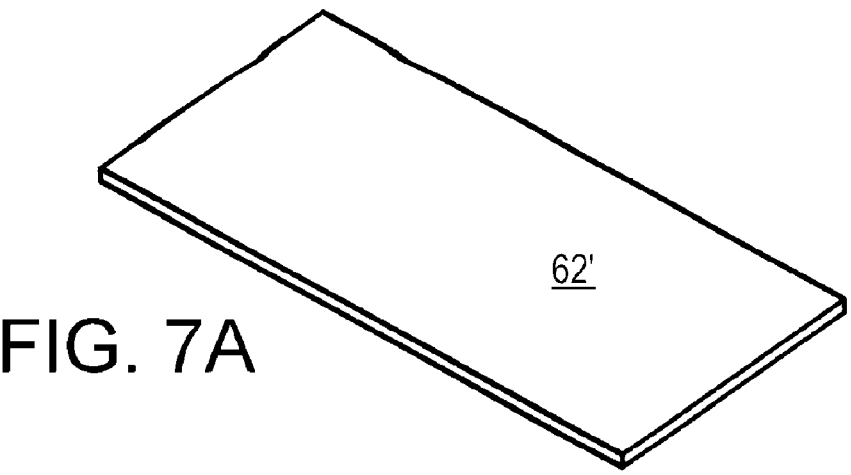
FIGS. 7A–E show an alternative integrated male slim USB connector integrated with metal dividers.
Figure 7B:
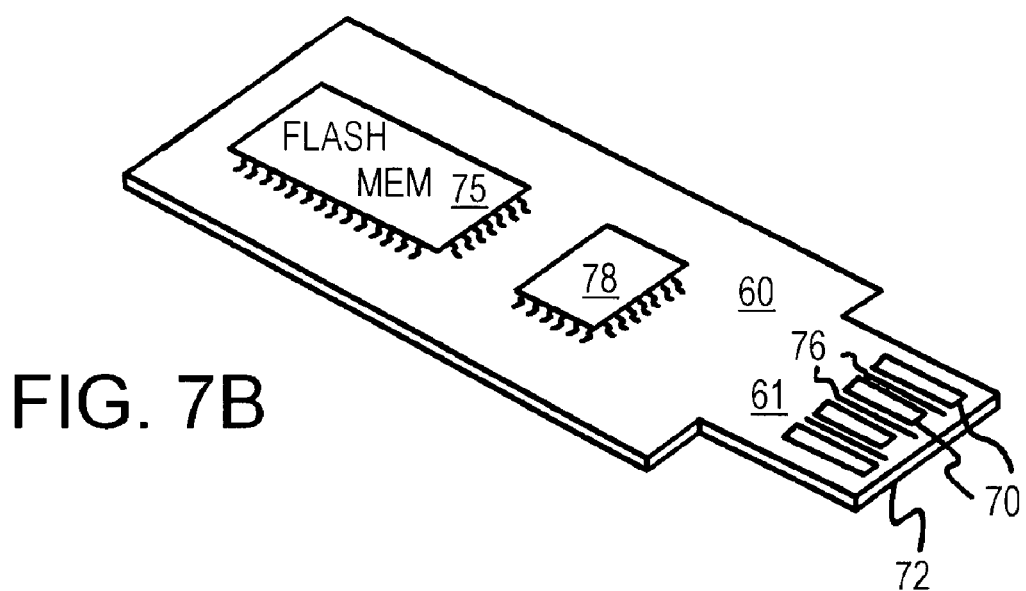

In FIG. 7B, flash memory chip 75 and controller chip 78 are mounted on board 60, which can be a multi-layer PCB or similar substrate with wiring traces. Extension 61 of board 60 has a width that is slightly wider than the width of the connector substrate in a male USB connector to account for the missing metal case wrap. Four metal contacts 70 are formed on extension 61 to act as the USB metal contacts of the male slim USB connector. End 72 of board 60 is inserted into the female USB connector.

Three metal dividers 76 are formed between pairs of metal contacts 70 on extension 61. These metal dividers help produce a better fit by filling the gap between connectors when inserted and metal contacts 70 depress the spring metal contacts on the female connector.

In FIG. 7A, upper case 62' can be made of plastic or other material. End rails and plastic dividers are not formed on upper case 62'. Instead, upper case 62' ends before the connector extension region. This allows metal contacts 70 of FIG. 7B to be exposed when assembled. End rails may be added to upper case 62' to further improve its fit into a female USB connector. The end rails may be taller than the metal dividers or may be the same height as the metal dividers.

Figure 7C:
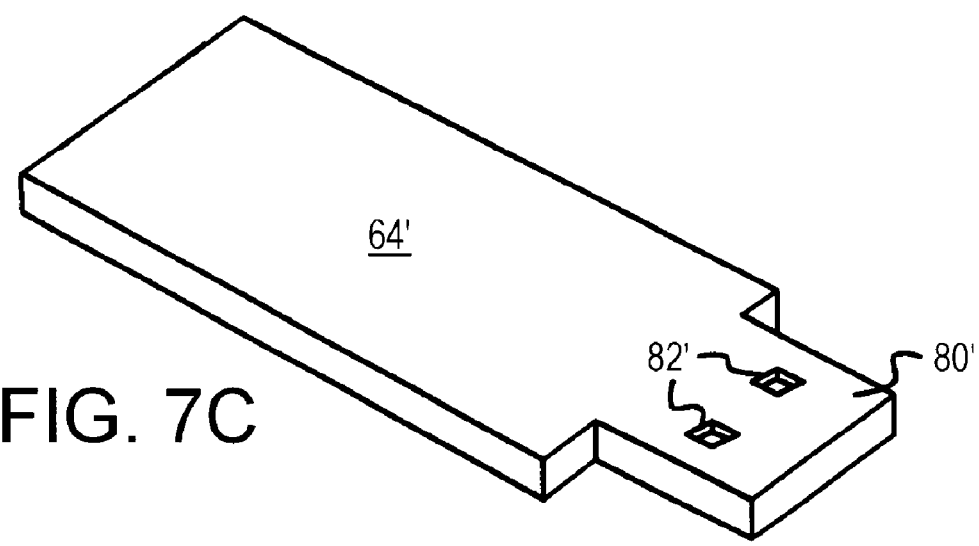

In FIG. 7C, lower case 64' includes extended region 80'. Locking depressions 82' are in extended region 80'. A single molding can form lower case 64' with locking depressions 82' in extended region 80'.

Locking depressions 82' can be made in a variety of ways. For example, locking depressions 82' can be made during molding of lower case 64', or by milling, punching, or machining case 64' after molding. Depressions 82' can be holes that completely pass through case 64', or can be thinned regions that do not reach completely through case 64'.

Figure 7D:
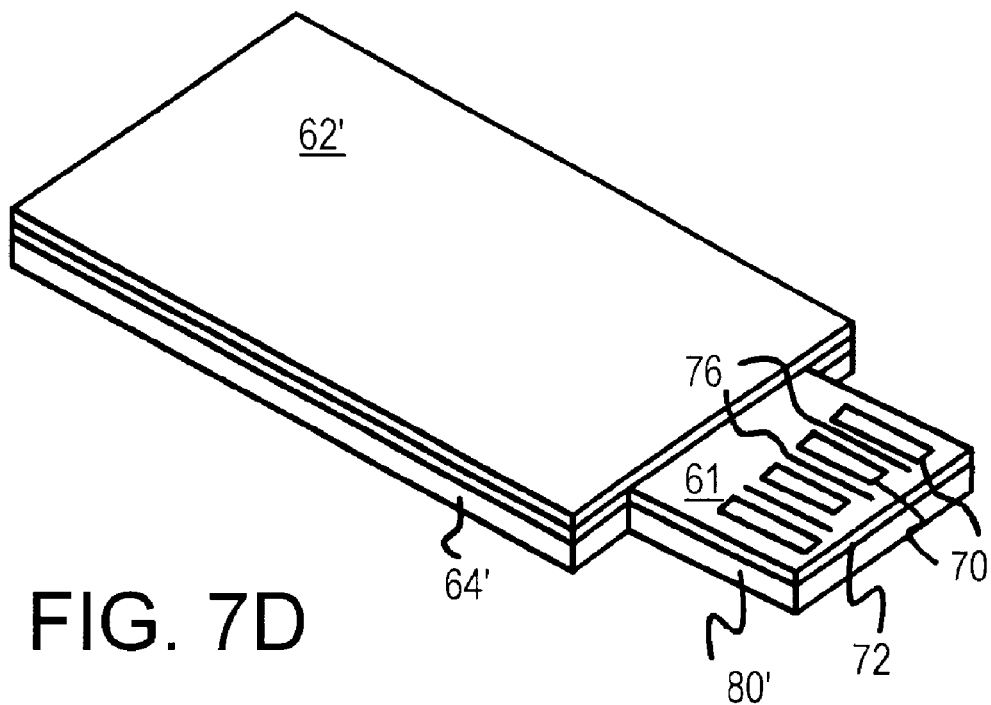

FIG. 7D shows an assembled USB flash-memory card. Upper case 62' and lower case 64' are plastic cases that fit together, mostly enclosing board 60 of FIG. 6B, although the edge of board 60 is visible in this embodiment. Upper case 62' ends before extension 61 of board 60 to expose metal contacts 70 on board 60. Locking depressions (not visible) are formed in lower case 64'.

Figure 7E:
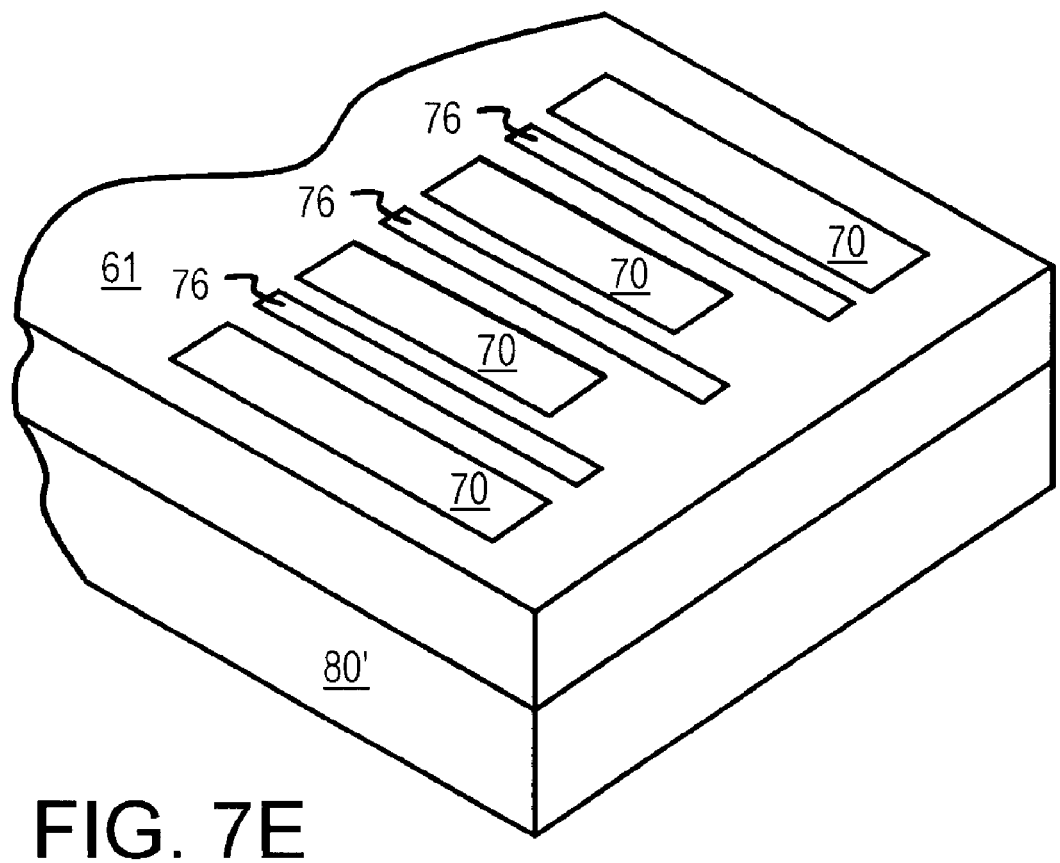

FIG. 7E is an enlarged view of extension 61. Metal contacts 70 are formed on the upper surface of board 60. Metal dividers 76 are also formed on this upper surface, between pairs of metal contacts 70. The two middle metal contacts 70 are shorter than the end metal contacts 70, as is standard for male US3 connectors. Metal dividers 76 can be the full length of the end metal contacts 70. Metal contacts 70 and metal dividers 76 can be bumped or superpositioned metal fingers rather than just flat metal lines. Metal contacts 70 depress the spring metal contacts on the female connector.

Figure 8A:
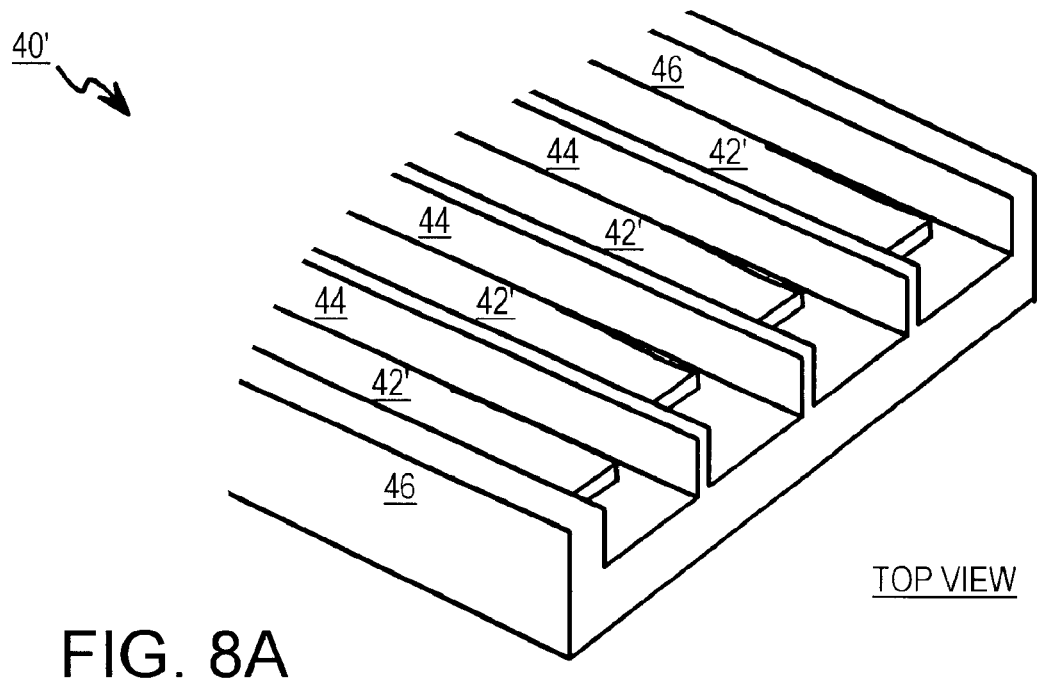
FIG. 8A shows an alternate embodiment of the male slim USB connector using flat metal contactors.

FIG. 8A shows an alternate embodiment of the male slim USB connector using flat metal contactors. Metal contacts 42' are flat metal contactors placed on a top surface of male slim USB connector 40' between dividers 44 and end rails 46. Dividers 44 and end rails 46 can have a low height to allow metal contacts 42' to reach the metal contacts on the female USB connector. End rails 46 may be taller than dividers 44 or may be the same height as the dividers.

Figure 8B:
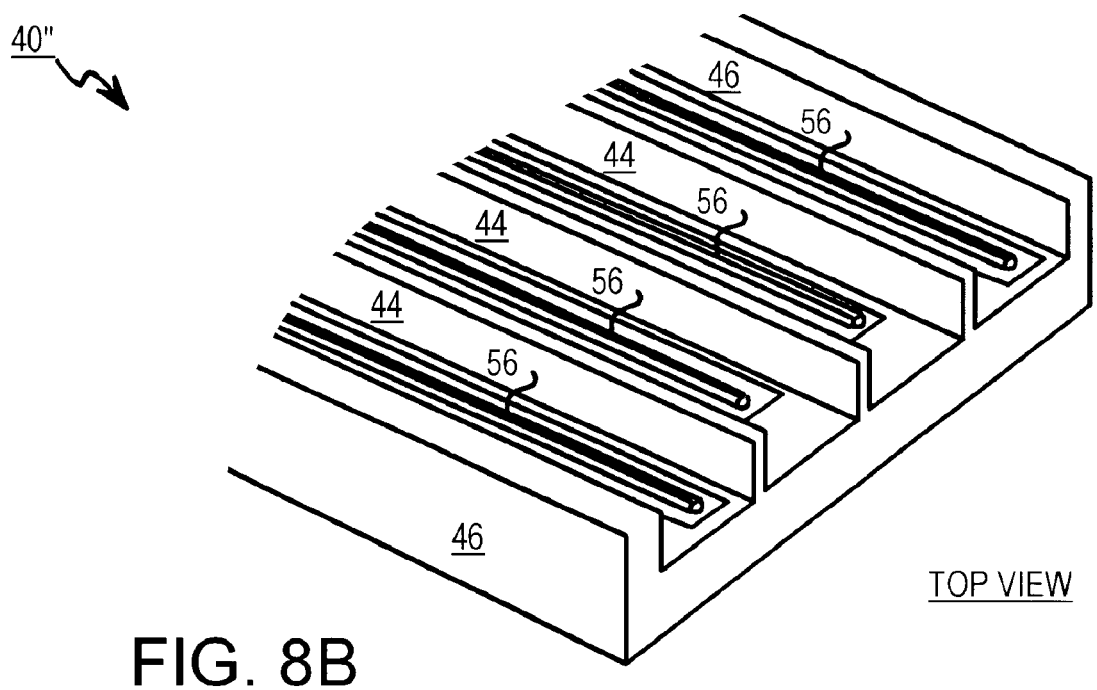
FIG. 8B shows an alternate embodiment of the male slim USB connector using metal rail contactors.

FIG. 8B shows an alternate embodiment of the male slim USB connector using metal rail contactors. Rather than use metal contacts 42 of FIG. 5, metal rails 56, which are metal contactors with a raised middle rail are used by male slim USB connector 40" to make electrical contact with the female USB connector. Metal rails 56 can have a desired height to make better contact with spring metal contacts on the female USB connector. Narrow dividers are shown as another alternative, but wider dividers 44 may be substituted. End rails 46 may be taller than dividers 44 or may be the same height as the dividers.

Figure 9A:
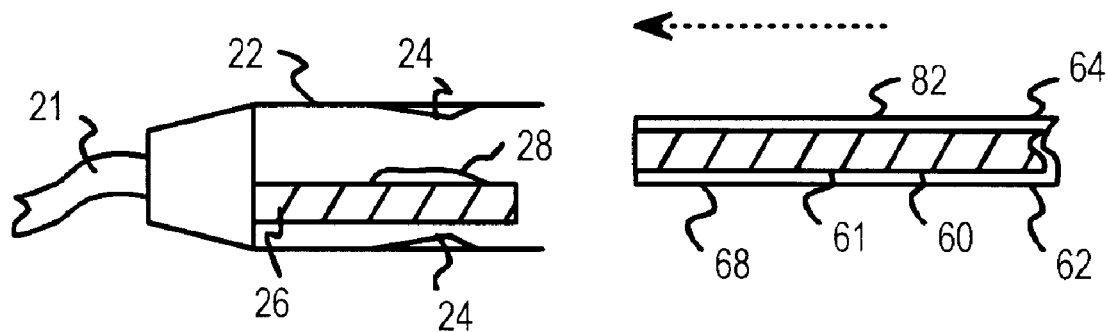
FIGS. 9A, 9B show an integrated male slim USB connector being inserted into a standard female USB connector.
Figure 9B:
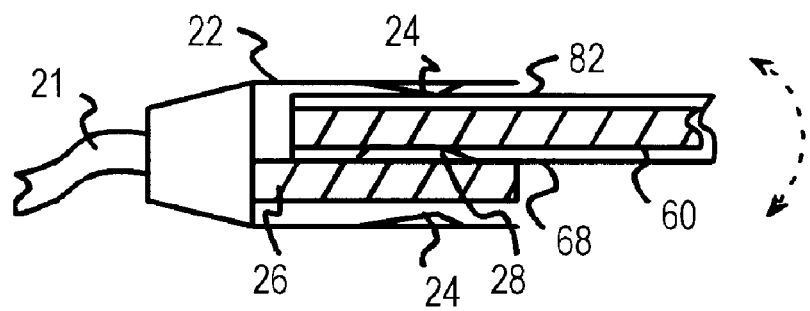

FIGS. 9A, 9B show an integrated male slim USB connector being inserted into a standard female USB connector. A male slim USB connector formed on extension 61 of board 60 is inserted from the right. Since this connector is inverted for insertion, upper case 62 is on the bottom, and has dividers 68 and end rails (not visible) formed near extension 61. Metal contacts (not shown) are formed on the lower surface of board 60 between dividers 68 and make electrical contact with metal contacts 28 when inserted.

Metal springs 24 in female USB connector 22 engage locking depressions (not visible) in lower case 64. When fully inserted, as shown in FIG. 9B, metal springs 24 can lock into the locking depressions. Metal springs 24 on the bottom of female USB connector 22 are not engaged since the male slim USB connector does not extend below connector substrate 26.

Dividers 68 fill in the gap between board 60 and connector substrate 26. This provides a better, more secure fit, reducing wobble. When combined with the locking action of metal springs 24 into the locking depressions, vertical play or wobble is significantly reduced.

Figure 10A:
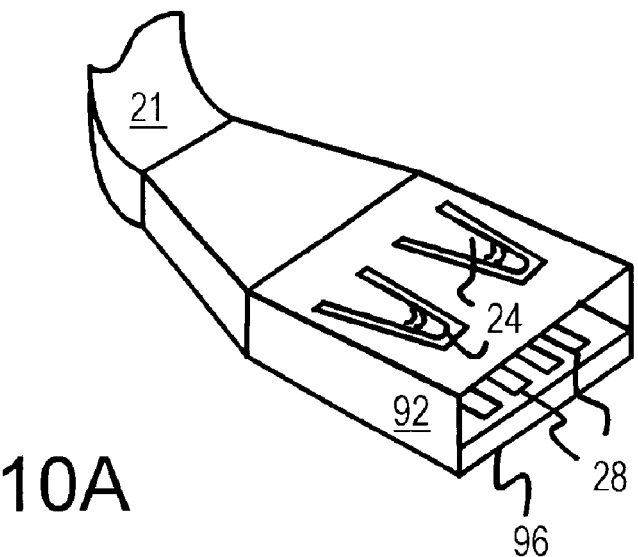
FIGS. 10A, 10B, 10C show a slim female USB connector and an integrated male slim USB connector being inserted into the slim female USB connector.
Figure 10B:
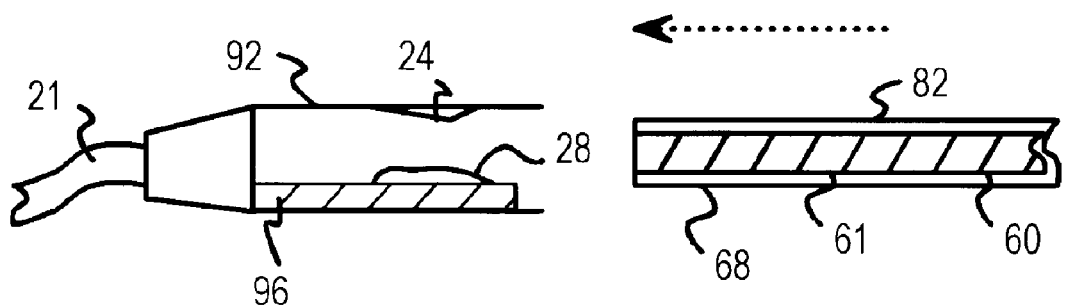
Figure 10C:
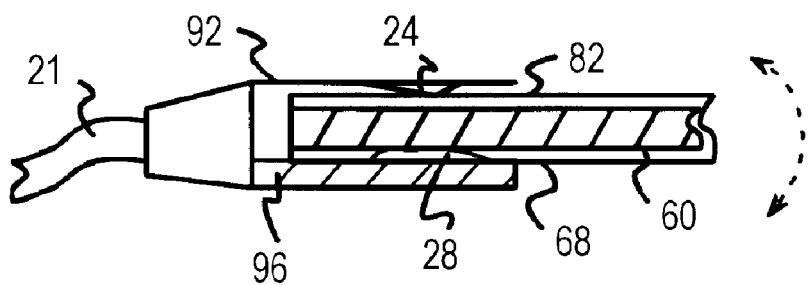

FIGS. 10A, 10B, 10C show an integrated male slim USB connector being inserted into a slim female USB connector. FIG. 10A shows a new slim female USB connector 92 that has a reduced height compared to standard female USB connectors. Slim female USB connector 92 is designed for connecting to the male slim USB connector of FIGS. 5, 6, 7, 8.

Connector substrate 96 is wider than the connector substrate in the standard female USB connector, reaching the sides of the metal case without a gap. Metal contacts 28 are formed on the top surface of connector substrate 96 and electrically connect to wires in cable 21. Metal springs 24 are provided on the top of the metal case but not on the bottom of the metal case. The metal case can cover the bottom of connector substrate 96 or not extend over the bottom of connector substrate 96.

In FIG. 10B, a male slim USB connector formed on extension 61 of board 60 is inserted from the right. Since this connector is inverted for insertion, upper case 62 is on the bottom, and has dividers 68 and end rails (not visible) formed near extension 61. Metal contacts (not shown) are formed on the lower surface of board 60 between dividers 68.

Metal springs 24 in slim female USB connector 92 can lock into the locking depressions in lower case 64 when fully inserted as shown in FIG. 10C. No metal springs are present on the bottom of slim female USB connector 92.

Dividers 68 fill in the gap between board 60 and connector substrate 96, providing a better, more secure fit, with less wobble. When combined with the locking action of metal springs 24 into the locking depressions, vertical play or wobble is significantly reduced.

Alternate Embodiments

Several other embodiments are contemplated by the inventors. For example, a variety of materials may be used for the connector substrate, circuit boards, metal contacts, metal case, etc. Plastic cases can have a variety of shapes and may partially or fully cover different parts of the circuit board and connector, and can form part of the connector itself.

The locking depressions can have a variety of shapes and sizes. Oval, round, square, rectangular, trapezoidal, and other shapes may be used. The locking depressions may be elongated into channels or have channels that guide the metal springs into the depressions as the connectors are inserted together. The depressions could be formed as part of a separate lower case as shown, or may be part of the connector substrate.

The slim connector may be considered "half-height", since it fits on one side of the female's connector substrate but not on the other side of the female's connector substrate. The actual "half-height" connector may not be exactly half the height of a standard connector, but is considered "half-height" because it engages only half of the female connector. The slim connector may be a reduction in height of only 30–40% rather than exactly half.

The slim connector may be widened to accommodate extra metal contacts to become an extended-USB connector for future USB specification. Moreover, the width of the slim connector can be widened, and the height and metal contacts of the slim connector can be varied, making it into a general-purpose slim connector, for USB, extended-USB, PCI Express, mini PCI Express applications, etc.

Other embodiments may use a stand-alone male slim USB connector such as shown in FIG. 5 rather than the integrated male slim USB connector. Other embodiments include removing the dividers from the stand-alone connector of FIG. 5. The end rails may be taller than the dividers or may be the same height as the dividers.

Other applications besides flash drives include USB connectors on desktop computers, notebook computers, PDA's, digital cameras, cellular phones or handsets, TV set-top boxes, MP3, MPEG4, copiers, printers, and other electronic devices. Such devices may use to advantage the slim-ness of the new male and/or female USB connectors, and may reduce size and space together with lower cost. A USB flash drive with the new slim male connector can still be directly inserted into a host PC with a legacy female USB connector.

There are 4 pins in the current USB pin out definition— VCC, GND, D+, and D−. VCC is the 5V power pin. GND is the ground pin and D+ and D− are the differential data I/O pins. For the USB 2.0 specification, data transfer rates are up to 480 M bits/sec, and the power supply current is 500 mA. These might not meet future (or even some current) needs of speed and power associated with some USB devices, such as large flash memory cards.

Additional metal contacts can be added to the new connectors. These additional metal contacts can serve as power, ground, and/or I/O pins which are extensions to the USB specification, or as PCI Express (or mini PCI Express) specifications. Greater power capability can be obtained with (or without) additional power and ground pins (or by a higher power supply current of the existing power pin). Multiple power supplies can also be provided by the additional power and ground pins. The improved power supply capabilities allow more devices and/or more memory chips to be powered. Extra I/O pins can be added for higher bandwidth and data transfer speeds. The additional I/O pins can be used for multiple-bit data I/O communications, such as 2, 4, 8, 12, 16, 32, 64, . . . bits. By adopting some or all of these new features, performance of flash memory cards/devices can be significantly improved. These additional pins could be located behind or adjacent to the existing USB pins, or in various other arrangements. The additional pins could be applied to male and female connectors, both the current or the new slim connectors. New types of flash memory cards/devices can be made with these new connectors, which have the additional pins.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A slim Universal-Serial-Bus (USB) connector comprising:
   a connector substrate;
   a plurality of metal contacts disposed on a contact surface of the connector substrate, the metal contacts for carrying USB signals;
   locking depressions formed below the connector substrate on a second surface opposite to the contact surface;
   wherein the locking depressions are for receiving metal springs from a female USB connector when the slim USB connector is inserted into the female USB connector; and
   end rails, substantially parallel to the metal contacts, along side edges of the connector substrate, the side edges being smaller in area than the contact surface and the second surface of the connector substrate and disposed between the contact surface and the second surface;
   a plurality of dividers, each divider disposed between an adjacent pair of the metal contacts, the plurality of dividers rising above the contact surface of the connector substrate;
   wherein the plurality of dividers are for filling in a gap between the connector substrate and the female connector substrate when the slim USB connector is inserted into the female USB connector;
   wherein the end rails are for sliding in gaps between sides of a female connector substrate of the female USB connector and a metal case surrounding the female connector substrate when the slim USB connector is inserted into the female USB connector.

2. The slim USB connector of claim 1 wherein a width of the slim USB connector is wider than a substrate within a standard male USB connector, but a height of the slim USB connector is less than a height of a metal case surrounding a standard male USB connector,
   wherein the female USB connector is a standard female USB connector or a slim female USB connector having a reduced height compared with the standard female USB connector.

3. The slim USB connector of claim 2 wherein the plurality of dividers are metal dividers formed on the contact surface of the connector substrate, or are plastic dividers.

4. The slim USB connector of claim 2 further comprising:
   a circuit substrate containing wiring traces;
   wherein the connector substrate is attached to the circuit substrate or is an extension portion of the circuit substrate.

5. The slim USB connector of claim 4 further comprising:
   a flash memory chip mounted on the circuit substrate.

6. The slim USB connector of claim 5 further comprising:
   a controller chip mounted on the circuit substrate, for reading data from and for writing data to the flash memory chip and sending the data over the metal contacts as USB signals to the female USB connector.

7. The slim USB connector of claim 6 further comprising:
   a plastic case that at least partially surrounds the circuit substrate and covers the flash memory chip and the controller chip.

8. The slim USB connector of claim 7 wherein the locking depressions are formed from a lower portion of the plastic case that at least partially covers the second surface of the connector substrate;
   wherein the end rails are formed from an upper portion of the plastic case that at least partially covers the contact surface of the connector substrate.

9. The slim USB connector of claim 8 further comprising:
   a plurality of dividers, each divider disposed between an adjacent pair of the metal contacts, the plurality of dividers rising above the contact surface of the connector substrate;
   wherein the plurality of dividers are for filling in a gap between the connector substrate and the female connector substrate when the slim USB connector is inserted into the female USB connector,
   wherein the dividers are formed from the upper portion of the plastic case that at least partially covers the contact surface of the connector substrate.

10. A Universal-Serial-Bus (USB) connector assembly comprising:
    connector assembly body without a surrounding metal case for insertion into a female USB connector;
    end rails on side edges of the connector assembly body, the end rails causing the connector assembly body to have an enlarged width that is greater than a standard width of a standard connector substrate on a standard USB male connector when a metal case surrounding the standard connector substrate is removed;
    metal contacts disposed along one or more upper surfaces between the side edges for making electrical contact with the female USB connector;
    dividers, each between a pair of the metal contacts, the dividers protruding upward from the one or more upper surfaces; and
    engaging depressions, on a bottom surface opposite the one or more upper surfaces, for engaging metal springs on the female USB connector,
    whereby the engaging depressions and end rails provide a secure fit into the female USB connector when the connector assembly body is inserted without a surrounding metal case.

11. The USB connector assembly of claim 10 further comprising:
    tabs protruding from a back surface of the connector assembly body, the tabs for making permanent electrical contact to a circuit board;
    embedded metal extensions of the metal contacts, the embedded metal extensions embedded within the connector assembly body and for connecting the metal contacts to the tabs through the connector assembly body.

12. The USB connector assembly of claim 11 wherein the engaging depressions engage metal springs on a first portion of the female USB connector but do not engage metal springs on a second portion of the female USB connector,
    whereby some metal springs on the female USB connector are engaged but other metal springs are not engaged.

13. The USB connector assembly of claim 12 wherein a height of the connector assembly body is less than a standard height of the standard USB male connector having the metal case surrounding the standard connector substrate, whereby the USB connector assembly has a reduced height.

14. The USB connector assembly of claim 13 wherein the dividers are plastic dividers or are metal dividers.

15. The USB connector assembly of claim 13 wherein the metal contacts are flat metal contacts or are bent metal contacts having a spring action, or are metal rail contactors.

16. The USB connector assembly of claim 13 wherein the tabs are soldered to a circuit board that has a flash memory chip and a controller chip mounted thereon.

17. A reduced-height Universal-Serial-Bus (USB) connector comprising:

connector body means, without a surrounding wrap, for insertion into a female USB connector, metal contactor means, attached to the connector body means, for making electrical contact with a female USB connector, engaging means, formed on a lower surface of the connector body means, the lower surface opposite the metal contactor means, for receiving a portion of metal springs on the female USB connector;

end means, on the connector body means, for extending side edges of the connector body means to fill in gaps to sides of the female USB connector produced by lack of the surrounding wrap surrounding the connector body means; and divider means, attached to the connector body means, for dividing gaps between the metal contactor means, whereby stability when inserted into the female USB connector is increased by the divider means, the end means, and the engaging means.

18. The reduced-height USB connector of claim 11 wherein the connector body means comprises a molding or comprises a portion of a circuit board having integrated circuits mounted on other portions thereon and one or more plastic cases partially surrounding the circuit board.

19. The reduced-height USB connector of claim 17 further comprising a reduced-height female connector for mating with the reduced-height USB connector, reduced-height female connector having metal contactor means on only one surface.

20. The reduced-height USB connector of claim 19 wherein power and ground pins provide a higher power supply current than defined by a USB specification.

* * * * *